(12) United States Patent
Ginis et al.

(10) Patent No.: US 8,499,069 B2
(45) Date of Patent: Jul. 30, 2013

(54) METHOD FOR PREDICTING PERFORMANCE OF DISTRIBUTED STREAM PROCESSING SYSTEMS

(75) Inventors: Roman Ginis, Arlington, VA (US); Robert E. Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1272 days.

(21) Appl. No.: 12/061,343

(22) Filed: Apr. 2, 2008

(65) Prior Publication Data

US 2008/0184262 A1    Jul. 31, 2008

Related U.S. Application Data

(63) Continuation of application No. 11/328,588, filed on Jan. 10, 2006, now Pat. No. 7,818,417.

(51) Int. Cl.
*G06F 15/173* (2006.01)
*G06F 15/16* (2006.01)

(52) U.S. Cl.
USPC .......................................... 709/224; 709/246

(58) Field of Classification Search
USPC ........................................................ 709/224
See application file for complete search history.

(56) References Cited

U.S. PATENT DOCUMENTS

| | | | |
|---|---|---|---|
| 5,687,369 A * | 11/1997 | Li ................................. | 1/1 |
| 6,643,682 B1 * | 11/2003 | Todd et al. .................... | 709/202 |
| 7,162,524 B2 | 1/2007 | Astley et al. ................. | 709/226 |
| 7,406,537 B2 * | 7/2008 | Cullen ......................... | 709/238 |
| 7,742,591 B2 * | 6/2010 | Paek et al. ................. | 379/266.01 |
| 7,818,417 B2 | 10/2010 | Ginis et al. ................. | 709/224 |
| 2003/0115291 A1 | 6/2003 | Kendall et al. ............... | 709/219 |
| 2003/0236878 A1 * | 12/2003 | Egi ............................. | 709/224 |
| 2004/0254993 A1 | 12/2004 | Mamas ........................ | 709/206 |
| 2005/0251556 A1 | 11/2005 | Ginis et al. .................. | 709/206 |
| 2005/0268146 A1 | 12/2005 | Jin et al. ....................... | 714/2 |
| 2006/0085507 A1 | 4/2006 | Zhao et al. ................... | 709/206 |
| 2006/0200251 A1 | 9/2006 | Gu et al. ........................ | 700/1 |
| 2006/0224668 A1 | 10/2006 | Ginis et al. .................. | 709/204 |

OTHER PUBLICATIONS

Robert E. Strom, Fault-Tolerance in the SMILW Stateful Publish-Subscribe System, IBM W18L Workshop, 26th International Conference on Software Engineering, pp. 1-6.
Roman Ginis and Rob Strom, An Automatic Messaging Middleware with Stateful Stream Transformation, IEEE, ICAC '04, pp. 1-3.

* cited by examiner

*Primary Examiner* — Thuong Nguyen
*Assistant Examiner* — Esther Benoit
(74) *Attorney, Agent, or Firm* — Harrington & Smith

(57) ABSTRACT

A method comprises estimating a performance of a processing system using queueing theory wherein the processing system comprises a network that accepts at least one input message stream from a plurality of publishing clients, transforms the at least one input message stream into at least one output message stream utilizing the plurality of transforms distributed in a first assignment among the plurality of brokers, and delivers the at least one output message stream to at least one of the plurality of subscribing clients, performing optimization upon the assignment of the plurality of transforms using the estimated performance to produce a second assignment, and reassigning the plurality of transforms in accordance with the second assignment.

22 Claims, 5 Drawing Sheets

METHOD FOR PREDICTING PERFORMANCE OF DISTRIBUTED STREAM PROCESSING SYSTEMS

CROSS REFERENCE TO RELATED APPLICATIONS

This application is a continuation of copending U.S. patent application Ser. No. 11/328,588 (now U.S. Pat. No. 7,818,417) filed Jan. 10, 2006 and is related to United States patent application Ser. No. 11/077,823 (now abandoned) filed on Mar. 10, 2005 to Roman Ginis.

TECHNICAL FIELD

The present invention generally concerns methods and apparatus for use in distributing information transforms implemented as software modules among broker machines comprising an overlay network operating in a publish-subscribe messaging system, and more particularly concerns methods and apparatus for improving throughput and latency in publish-subscribe messaging systems having an overlay network of broker machines by appropriately distributing information transforms among broker machines.

BACKGROUND

A publish-subscribe middleware messaging system is a type of a distributed stream processing system. Such a system may include, for example, publishing clients, message service providers, subscribing clients and a plurality of broker machines, or brokers. The plurality of broker machines constitute an overlay network responsible for managing messaging activities occurring between and among the publishing clients, message service providers and subscribing clients. Publishing clients generate input messages (also called events) which contain one or more topics and data content, and submit them to the overlay network of broker machines. The broker machines perform transforms on information contained in the input messages generated by the publishing clients according to pre-determined specifications, thereby transforming the input messages to output messages. The information transformations are implemented as one or more software modules that are distributed among the broker machines comprising the overlay network. The output messages containing the transformed information are then delivered to the subscribing clients. The pre-determined specifications are typically created by message service providers who know the form and content of information that is of interest to clients subscribing to their messaging services.

Publish-subscribe middleware messaging systems frequently operate in an anonymous manner, meaning that publishing clients may not know how many subscribing clients there are or where they are, and, similarly, subscribing clients may not know the identity or location of publishing clients.

Publish-subscribe middleware messaging systems also may operate on input message streams in either a so-called "stateless" or "stateful" manner. A "stateless" (also called topic-based or content-based) publish-subscribe system is one in which (1) delivered messages are a possibly filtered subset of published input messages, and (2) a subscription criterion selected by a message service provider is a property that can be tested on each message independent of any other, such as "topic=stock-ticker" or "volume>10000 & issue=IBM".

A "stateful" publish-subscribe system is one where subscriptions are "stateful"; that is, the publish-subscribe system creates output messages containing information derived from multiple messages culled from one or more message streams, e.g. "Give me the highest quote of IBM within each one-minute period." This, furthermore, generally entails delivering information other than simply a copy of published messages, for example, "Tell me how many stocks fell during each one-minute period."

In both the stateless and stateful cases, publish-subscribe middleware messaging systems are implemented as overlay networks, that is, a collection of broker machines that accept messages from publishing clients, deliver subscribed information to subscribing clients, and route information between publishing clients and subscribing clients.

Once a publish-subscribe middleware messaging system starts computing transforms, the placement of the software modules performing these computations becomes central to the performance of the messaging system. At a high level, this problem is similar to many earlier task assignment problems in parallel and distributed systems. However, the transform tasks that do stream processing of database operators have unique properties. These tasks are always available and therefore always running, and their resource utilization is a function of incoming message rates generated by publishing clients. The data flows from specific sources (publishing clients) to specific sinks (subscribing clients), fixing some tasks to specific processors. Furthermore, a common objective typically applied in such situations—load balancing the system for better resource utilization—is not as important. Typically client subscription update latency and throughput are more important system performance metrics and their improvement or optimizations are often the key objectives.

Accordingly, in publish-subscribe middleware messaging systems implemented through overlay networks that employ a plurality of broker machines, there exists a desire for a method and an apparatus for appropriately distributing information transforms among broker machines comprising the overlay network.

In addition, there exists a desire to have a selection of one or more performance metrics that would be improved or optimized through appropriate placement of information transforms among the broker machines comprising the overlay network. Particularly desired are methods and apparatus for placing information transforms among broker machines comprising the overlay network so that the latency and throughput of messaging activities performed by the broker machines comprising the overlay network are improved.

SUMMARY OF THE PREFERRED EMBODIMENTS

In accordance with an embodiment of the invention, a method comprises estimating a performance of a processing system using queueing theory wherein the processing system comprises a network that accepts at least one input message stream from a plurality of publishing clients, transforms the at least one input message stream into at least one output message stream utilizing the plurality of transforms distributed in a first assignment among the plurality of brokers, and delivers the at least one output message stream to at least one of the plurality of subscribing clients, performing optimization upon the assignment of the plurality of transforms using the estimated performance to produce a second assignment, and reassigning the plurality of transforms in accordance with the second assignment.

In accordance with an embodiment of the invention, there is provided a signal bearing medium tangibly embodying a program of machine-readable instructions executable by a digital processing apparatus to perform operations to optimize an assignment of transforms, wherein the operations comprise estimating a performance of a processing system using queueing theory, the processing system comprising, a plurality of publishing clients, a plurality of subscribing clients, and a plurality of broker machines comprising a network that accepts at least one input message stream from the plurality of publishing clients, transforms the at least one input message stream into at least one output message stream utilizing a plurality of transforms distributed in a first assignment among the plurality of brokers, and delivers the at least one output message stream to at least one of the plurality of subscribing clients and wherein each movement of one the input message streams to one of the output message streams comprises a data flow, performing optimization upon the assignment of the plurality of transforms using the estimated performance to produce a second assignment, and reassigning the plurality of transforms in accordance with the second assignment.

In accordance with an embodiment of the invention, a system comprises a plurality of publishing clients, a plurality of subscribing clients, a plurality of broker machines comprising a network that accepts at least one input message stream from the plurality of publishing clients, transforms the at least one input message stream into at least one output message stream utilizing a plurality of transforms distributed in an assignment among the plurality of brokers, and delivers the at least one output message stream to at least one of the plurality of subscribing clients, means for estimating a performance of the processing system using queueing theory, means for performing optimization upon the assignment of the plurality of transforms using the estimated performance to produce an improved assignment exhibiting an improved performance, and means reassigning the plurality of transforms in accordance with the improved assignment.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION

In order to compute and deliver message sequences from brokers to subscribers efficiently in a publish-subscribe middleware messaging system, the transforms involved in the myriad computations are preferably placed on the nodes of the broker network in an order, or pattern, tending to maximize some measure of performance. In an exemplary embodiment of the system of the invention, this placement of transforms is done continuously in response to system state changes, resource availability and client demands. More specifically, the pattern in which transforms are distributed throughout the broker network is evaluated for efficiency using queuing theory as described more fully below. The results of the evaluation are used to perform a transform distribution optimization. The results of the transform distribution optimization are used to distribute the transforms across the broker network in an increasingly optimal manner.

In an exemplary embodiment of the invention, a plurality of broker machines are responsible for the delivery of messages sent by publishing clients, or publishers, towards subscribing clients, or subscribers, based upon the content of these messages and transformations specified by messaging services and subscribed to by the subscribing clients. The broker machines form an overlay network. The description of the overlay network is similar to the description in co-pending U.S. patent application Ser. No. 10/177,474 entitled "A Method of Guaranteed Delivery of Messages in a Highly Scalable Publish/Subscribe System", assigned to the same assignee as the present application, and which is hereby incorporated by reference in its entirety as if fully restated herein.

Some broker machines may be specialized for hosting publishing clients—these will be referred to as publisher-hosting brokers (hereinafter "PHBs"), others for hosting subscribing clients—these will be referred to as subscriber-hosting brokers (hereinafter "SHBs"). Between the PHBs and SHBs there may be any number of intermediate hops that include routing and filtering—the brokers at such hops will be referred to as intermediate brokers (hereinafter "IBs"). For expository purposes, it will be assumed that the functionality of PHBs, SHBs and IRs are implemented in separate machines, but in actual deployment it may be that all machines combine these functions.

Figure 1:
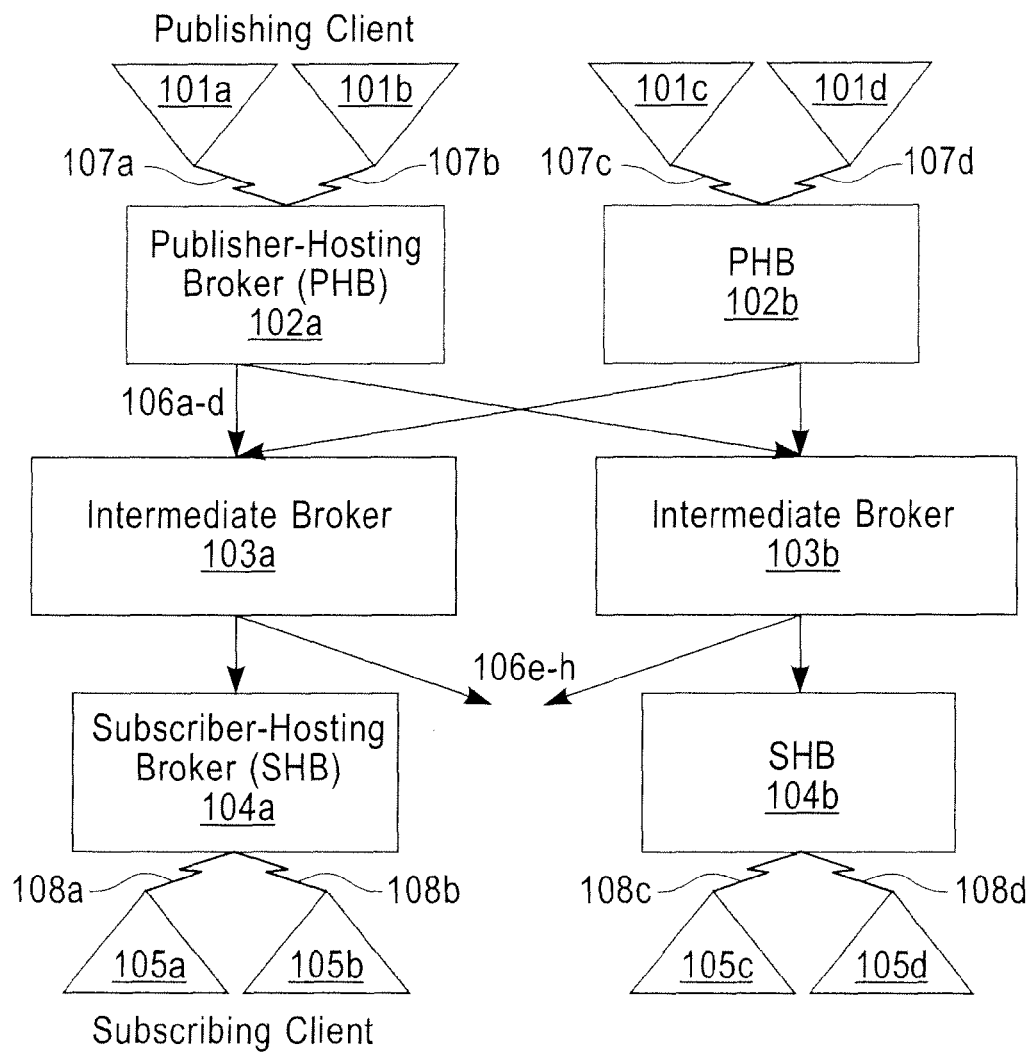
FIG. 1 depicts an exemplary broker network which hosts the publish-subscribe system of the invention, illustrating publishers, subscribers, brokers and links.

FIG. 1 illustrates part of a typical network of brokers used in the present invention. A publishing client such as 101a establishes a connection to a PHB 102a over a client connection 107a. The client connection 107a can be any reliable FIFO connection such as a TCP/IP socket connection. Independently, a subscribing client such as 105a establishes a connection to a SHB 104a over a similar FIFO client connection 108a. The PHBs and SHBs 102, 104 are connected through broker-to-broker channels 106 and intermediate brokers 103. As used herein, "links" refer to the logical connections between coupled entities such as publishers and subscribers, while "channels" refer to the physical media through or over which such data travels. Since a fault-tolerant protocol tolerates link failures and message reorderings, it is not necessary for the broker-to-broker connections to use reliable FIFO protocols such as TCP/IP, but may advantageously use faster, although inherently less reliable, protocols. Each broker machine can be either a standalone computer, a process within a computer, or (to minimize delay due to failures) a cluster of redundant processes within multiple computers. Similarly, the links may be simple socket connections, or connection bundles that use multiple alternative paths for high availability and load balancing.

Figure 2:
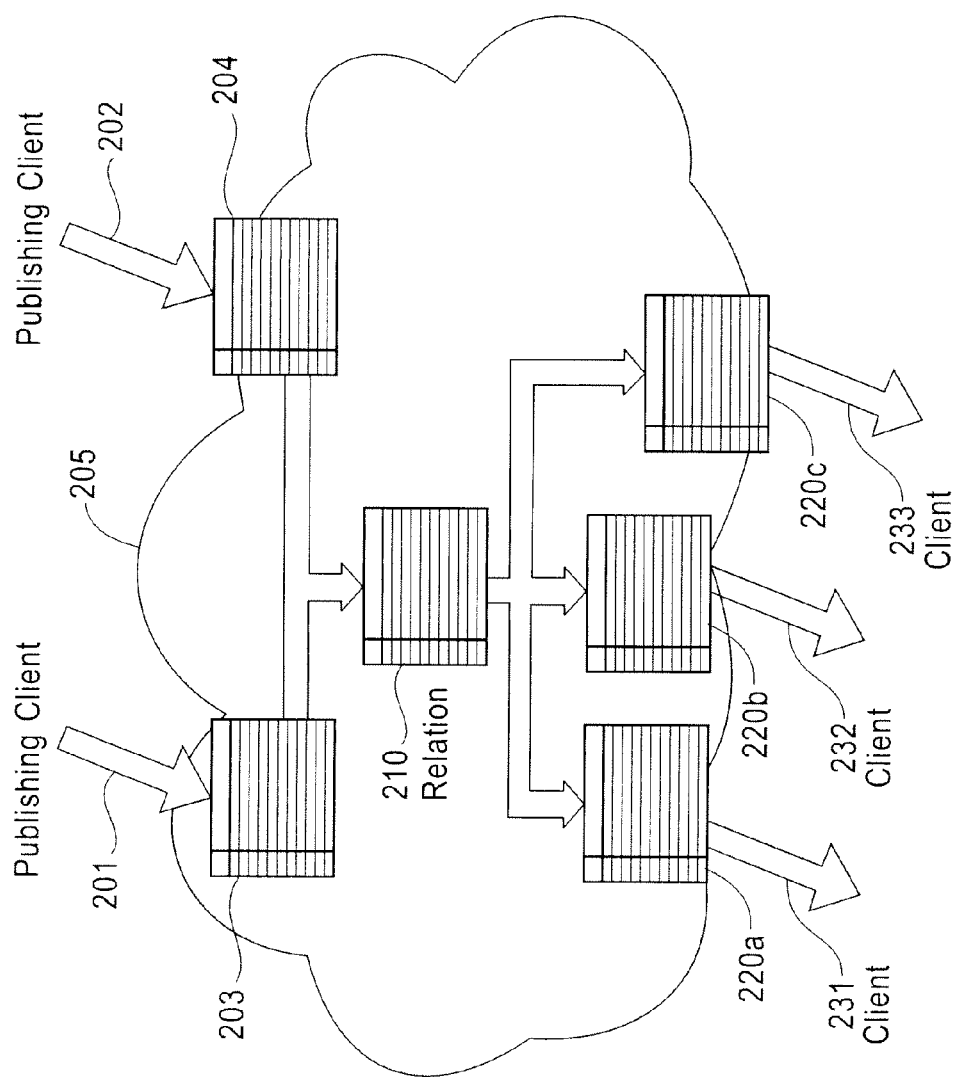
FIG. 2 depicts a service provided by the invention as seen by publishers and subscribers in an exemplary embodiment, illustrating base relations, derived and subscribed views, and subscription.

FIG. 2 illustrates how the stateful publish-subscribe service of the invention appears to clients. Clients are unaware of the physical broker network or its topology; a client application may connect to any broker in the role of publisher and/or subscriber. Publishing clients, such as 201 and 202, are aware only of particular named streams. Multiple clients may publish to the same stream. In FIG. 2, client 201 is publishing events to stream 203, and client 202 is publishing events to stream 204. Administrators and clients may define derived views based on functions of either published streams or other derived views. In an embodiment of the invention, published streams are represented as relations, and derived views based on functions of either published streams or from other derived views by means of relational algebraic expressions in a language such as Date and Darwen's Tutorial-D or SQL or XQUERY. For example, view 210 is defined as a function of stream relations 203 and 204 by means of a join expression with relations 203 and 204 as inputs and relation 210 as output. Such a specification deriving relation 210 from relations 203 and 204 is indicated in the figure by the hyperedge 205 (two-tailed arrow leading from 203 and 204 to 210). Similarly, relations 220a, 220b and 220c are derived from relation 210 by client-specified relational expressions—for example, 220c could be a request to group the stock trades of relation 210 by issue and hour, and compute the running total volume, and max and min price for each issue-hour pair. Each client subscribes to a particular derived view; in this figure clients 231, 232 and 233 are subscribers, subscribing respectively to views 220a, 220b and 220c which they have specified by relational expressions. As published events enter the system from publishing clients 201 and 202, they are saved in their respective streams 203 and 204. The system is then responsible for updating each derived view according to the previously specified relational expressions, and then delivering to each subscriber client messages representing the changes to the state of his subscribed view.

The above description describes the service specification of the system as it appears to clients. The U.S. patent application Ser. No. 10/177,474 entitled "A Method of Guaranteed Delivery of Messages in a Highly Scalable Publish/Subscribe System" describes a preferred embodiment for implementing this specification on a fault-free broker network.

Figure 3:
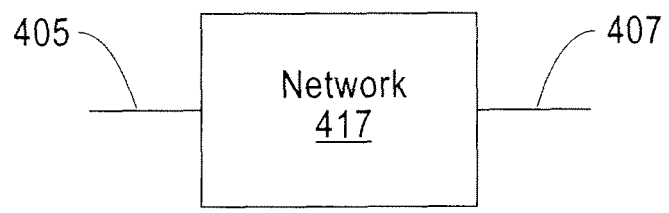
FIG. 3 depicts an exemplary configuration of a network according to the invention.

With reference to FIG. 3, there is illustrated the relationship between a network 417 and its input and outputs. As described more fully below, network 417 receives one or more input streams 405 and outputs one or more output streams 407.

Figure 4:
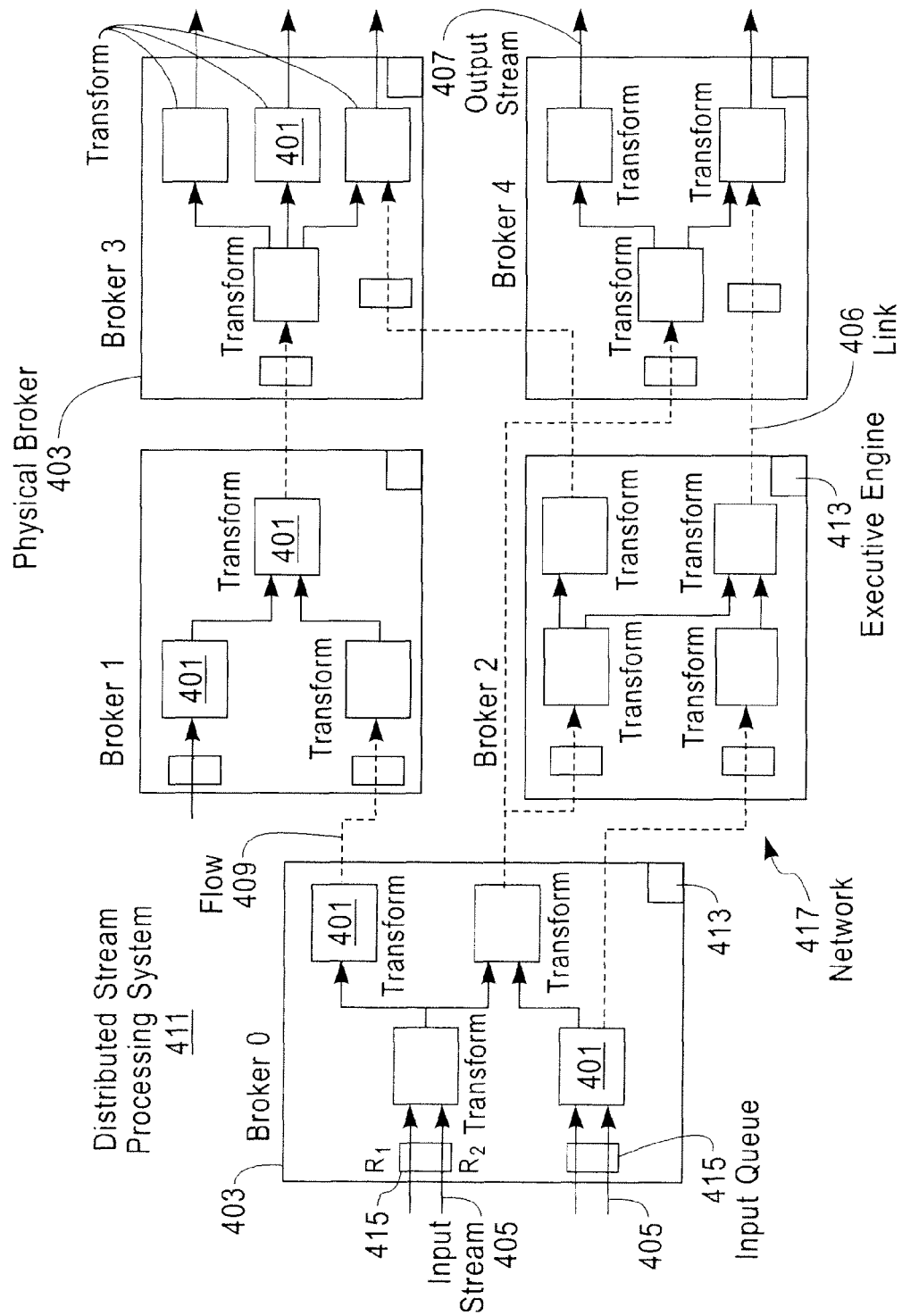
FIG. 4 depicts the flow of events through the transforms in a network of brokers comprising a portion of a distributed stream processing system according to an exemplary embodiment of the invention.

With reference to FIG. 4, there is illustrated the flow of events through the transforms 401 in a network 417 of brokers 403 that make up a portion of a distributed stream processing system 411. As such, FIG. 4 is a global directed acyclic dataflow graph that models a portion of the distributed stream processing system 411 of the invention. For purposes of describing mathematical properties of the global directed acyclic dataflow graph, the graph, or portions thereof, will be described more fully below and referred to using the notation "F". Events enter the distributed stream processing system 411 at one or more input streams 405; updates to these streams 405 then flow through one or more transforms 401. Each transform 401 computes an incremental change to its output state, delivering a message to a new transform 401 via a link 406. Transforms 401 may have multiple inputs. For example, an incremental join of relations $R_1$ and $R_2$ may have one input representing insertions, deletions, or updates to $R_1$, and another input representing insertions, deletions, or updates to $R_2$. Final outputs 407 are delivered to clients (not shown).

For each input stream 405, I is modeled as a relation mapping a tick of discretized time into either: (a) an event that happened at that tick, (b) a silence, meaning that no event happened at that tick, or (c) "unknown," meaning that this tick lies in the future, and that it is currently unknown whether the tick will eventually resolve to a silence or to an event. In the embodiment illustrated, time is discretized into tick intervals that are small enough so that the chance of two events occurring in the same interval is negligibly small resulting in an approximation of continuous time.

A distributed stream processing system 411 is described by: (1) a set of input stream sources 405; (2) a set of output stream 407 "clients", (3) a directed acyclic dataflow graph F, whose sources are the input streams 405, whose sinks are the output streams 407, and whose intermediate nodes are transform tasks 401 communicating over logical links 406.

Once a global data flow graph is established, the transforms 401 of the graph are partitioned by assigning particular transforms 401 to physical brokers 403. The flows 409 between transforms 401 on different brokers 403 are assigned to physical connections (channels) between brokers. The assignment maps each transform 401 to a particular broker 403.

An execution engine 413, formed of a processor, within each broker 403 takes events arriving at a channel feeding the broker 403 as input to one of its transforms 401, processes it through the transforms 401 that depend upon the event and then delivers outputs 407 either to clients or to channels to other brokers 403.

When transform tasks, operating on transforms 401, are assigned to brokers 403 they are also coalesced into execution modules M. An m∈M contains a connected subgraph of F such that the logical links 406 between them are all assigned on the same broker 403. The sources of m are either input stream messages 405, or are messages traveling over a logical link 406 between transforms 401 of the original graph that are mapped to a physical channel between brokers. The sinks of m are either output stream messages 407, or are messages traveling over a logical link to some transform 401 that is assigned to a physical channel to a transform 401 in another broker 403.

Each broker 403 has an input queue 415. An input queue may be, but is not limited to, a FIFO queue. Messages arrive at the queue 415 from any source of one of the modules m. The broker 403 is modeled as a server that dequeues a message from the input queue 415, determines which transform 401 it is destined to, and then executes that transform 401. This may cause one or more output messages 407 to be produced. Messages destined for outside of the broker 403 will be delivered either to the client or to the channel to the next broker 403. Messages destined for another transform 401 in the same broker 403, following a link 406 in the transform graph, will cause that transform 401 to execute, possibly generating more messages 407. This cascade will continue until all dependent transforms 401 have executed, and then the next message will be dequeued.

Having therefore described the general structure of the distributed stream processing system 411, and, in particular, the interaction and performance of messages, transforms 401, brokers 403, clients, links 406, and channels, there follows an explanation of the method by which transforms 401 are distributed throughout the distributed stream processing system 411, the method by which the distribution of transforms 401 is evaluated for efficiency, and the method by which such an evaluation is utilized to more efficiently distribute the transforms 401 on brokers 403 throughout the distributed stream processing system 411.

As employed herein, a "transform" may be defined as a logical operation performed upon an input data stream to produce an output data stream. For purposes of the following discussion, it is of little import the methodology employed to achieve an initial allocation of the transforms 401 upon the brokers 403. The embodiments of the invention provide a methodology for evaluating an existing configuration and distribution, however initially determined, of transforms 401 amongst brokers 403. As noted above, typical methodologies for measuring the efficiency of a distribution of transforms amongst brokers involve the measuring of performance criteria such as message latency and message throughput. A disadvantage of using such criteria arises from the fact that there is assumed to be no queueing delays resulting from the time between the receipt of a message in a queue and the dequeuing and processing of that message by the broker serving that queue. In reality, such delays exert a measurable influence upon the operation of the distributed stream processing system 411. Embodiments of the invention therefore utilize the application of an estimation technique referred to, in general, as queueing theory to more accurately model the performance and efficiency of the distributed transforms 401.

Queueing models describe the behavior of brokers 403 in a distributed system 411. When employing such a model, the performance of each broker 403 is characterized as a multi-class server where the classes correspond to the flows it hosts. To begin, one specifies the models for each variety of relational transform 401 constituting a building block for flows.

For each transform 401, it is desirable to determine the distribution of its service time per input message, and the distribution of the "batch sizes" of output messages 407. The batch sizes are significant, since some transforms 401 (such as SELECT) might absorb some messages without generating new messages 407 (a batch size of zero), and other transforms 401 (such as JOIN) might absorb a message 407 and transmit multiple messages 407.

The select transform 401 in a stream processing system 411 acts as a filter. For every arriving event, the select transform 401 tests a logical predicate against the event data and passes the event through if the predicate is satisfied. From a performance perspective, it is necessary to analyze the service time of the transform and its departure process. An example of a SELECT query is:
SELECT exchange, issue, price WHERE exchange="NYSE" AND issue="MSFT" AND price=28

Although it is possible for such a transform 401 to take a varying amount of processing time per message (for instance, if there is a conjunction of expensive predicates with varying selectivity, or if the messages are varying sized documents), in many message-oriented middleware systems, these costs are typically constant, the cost of evaluating the predicate being dominated by the cost of accessing the relevant fields of the payload. Additionally, in many systems derived from content-based filtering, the transform will be called upon to execute multiple SELECT queries with different predicates in parallel, effectively forwarding the event to that subset of these queries that successfully match. Algorithms exist to simultaneously match n separate queries on the same event in time proportional to $n^{1-\lambda}$, where $\lambda$ depends upon the number of attributes and value ranges.

For the purpose of this analysis, it is assumed that the service time is approximately constant, and the batch size is distributed as a random variable, either 0, or 1, whose mean, a measured parameter $\rho$, corresponds to the selectivity of the transform.

The sliding window transform operates on a stream I that is either an input stream, as previously described, or that has the same structure as an input stream , namely a mapping from discrete ticks to "silences," "events," or "unknown" values.

The output of a sliding window transform is a stream O that is also modeled as a mapping from ticks to events, silences, or unknowns, except that in this case, a silence can mean either that no event happened at that tick, or else that the tick is "old" (there are more than T later ticks that are known, where T is a parameter of the operator that determines how many ticks of time an event stays recent).

The actual representation of I and O exploits the facts that: (a) events are sparse relative to silences, and (b) there is a horizon time h such that for i<=h, tick i maps to either an event or a silence, and for i>h, tick i maps to unknown, representing the fact that events are received in time order. The representation stores only h and the ordered list of events with their tick times; any tick i not in that list maps to silence if i<=h, and to unknown if i>h. Messages updating I correspond to new events, and contain the tick number m of the new event, and the range of preceding silent ticks (a redundancy needed to check for lost or out-of-order messages; under normal operation, the range should always be [h+1,m-1]). When an event is received, it is recorded in the list, and the horizon is advanced from h to m.

The sliding window transform maintains the latest events that occurred within some interval of size T, e.g. the latest hour of stock trade events. When the sliding window transform processes the event, it records the new event at m, and the new horizon, and then, since the window has advanced by m-h ticks, it must "kick out" any events which are no longer in the window (that is, which have tick times between the original beginning of window h-T+1 and the new beginning of window m-T+1). The transform outputs a batch consisting of the added event at time m, and some set of zero or more "anti-events" corresponding to the removal of the events that fell out of the window.

It is further possible to model the case where the events arriving at the sliding window transform are produced by a stochastic process. Since each arriving event produces a batch, it is evident that the output of the sliding window transform has an identical distribution to the input. However, it remains to analyze the batch sizes. Suppose that the probability for the waiting time for the next event to equal t is given as a probability distribution function $W_1(t)$, and that the probability of exactly k events occurring within a period of t ticks is also given as a function p(k, t). When an event occurs at time m, when the previous event arrived at time h, then the waiting time was t, and therefore it is necessary to advance the window by t and "kick out" events from the t earliest ticks at the top of the window. One can derive the probability $P_k$ that there will be exactly k batched anti-events in a given batch (and therefore a batch size of k+1 due to the inserted event) by integrating, over all possible waiting times t, the probability of k events existing in the top of the window, weighted by the probability that the waiting time was t. That is $$P_k = \int_0^\infty W_1(t) p(k, t) dt$$

Given the set of $P_k$, one can derive the moments $M_1$ and $M_2$ as $$M_1 = \sum_{k=0}^\infty k P_k \text{ and } M_2 = \sum_{k=0}^\infty k^2 P_k$$

where the mean M1 and the variance $v = M_2 - M_1^2$. The expected batch size is then $1 + M_1$.

In particular, suppose that the events arriving at the sliding window transform are produced by a Poisson process with parameter λ events per tick. For this distribution, the probability p(k, t) that there are exactly k events in a period of t ticks is given by:

$$p(k,t) = (\lambda t)^k e^{-\lambda t}/k!$$

The probability distribution for t is given by the expression for the waiting time for the first event, $W_1(t)=\lambda e^{-\lambda t}$. The weighted probability of k events being kicked out (and hence of a batch size of k+1) is given by:

$$P_k = \int_0^\infty W_1(t) p_k(t) dt = 2^{-1-k}$$

The moments are $M_1=1$ (one expects this to be true in any distribution, since on the average one event will leave the window for every event that entered), and $M_2=3$, yielding a variance of $3-M_1^2=2$. Therefore, the expected batch size is $1+M_1=2$, with a variance of 2.

Another transform 401 of importance in a stream processing system 411 is the relational JOIN. Stream joins are widely used for specifying correlations and operating on more than one stream at a time, for example matching buy offers and sell offers that match in issue and price.

One of the most common implementations of a stream join is a double-hash join. Let $J(R_1,R_2)$ be an in-memory pipelined relational join implemented as a double-hash equi-join on relations $R_1$ and $R_2$. The traditional (non-streaming) hash join is constructed in two phases: 1) the table-building phase and the 2) tuple-probing phase. In the first phase hash tables $H_1$ and $H_2$ are created from the input relations $R_1$ and $R_2$, respectively, using hash functions on join attributes. In the probing phase, tuples of one relation are used to probe the hash table of the other relation for matches.

In the streaming version of a hash join, the input relations are not immediately available at the beginning of the operation, but instead the tuples for each of the input tables continue to arrive indefinitely. Therefore, the two phases are executed for each tuple as they arrive. For example, a new tuple r arriving to $R_1$ is first hashed in $H_1$ and then immediately probed against $H_2$. As a result, the streaming join continuously produces rows in response to changes to its input relations $R_1$ and $R_2$ to complete the join result $R_1 \bowtie R_2$.

It is assumed that over long time periods, the state needed for each transform is kept in main memory and will not grow without bounds. This assumption will often be true in practice, either because of the nature of some applications (e.g. buy bids are eventually matched with sell bids and removed from the set of available bids), or because some other mechanism, such as an expiration time or a sliding window is used to bound the length of time information remains in the system.

Let $J(R_i,R_j)$ be a join transform and let $p(v \in R_i)$ be the probability mass function (pmf) of the distribution of values in relation $R_i$ with respect to the join predicate of J. Let $z_i,z_j \in N^+$ be the number of tuples available for joining for the relations $R_i$ and $R_j$ respectively. While $p(v\chi R_i)$ and $p(v\chi R_j)$ and $z_i,z_j$ can be different, for simplicity of exposition and without loss of generality, it is assumed that the pmf's and the window sizes are respectively the same for both relations and refer to them simply as p and z respectively.

Now for a given tuple $v\chi R_i$ the number of tuples matched in $R_j$ is then:

$$m(v):R_j \delta R^+ = z^*p(v)$$

$$m(v):R_j \rightarrow + = z^*p(v)$$

From this one can define selectivity of $J(R_i,R_j)$, as the probability density function of the number of tuples matched N by a new event as:

$$\rho(n) = \sum_{n=m(v)} p(v)$$

where n is a value of N. Now, the random variable N and its probability distribution ρ(N) are the key to characterizing two variables essential to the performance model: output batch size B and service time D.

It is now possible to translate the selectivity of the join defined above into its service time and output size.

Suppose that the amount of processing work required by the stream join is c (cycles/tuple) for a tuple that matches exactly one tuple in the target table (which is a special case when the join is performed on the key column of the target table). Then, it would require k*c cycles if the tuple matched k tuples on the target table. This includes the hashing of the tuple, the lookup cost, the retrieval and return of the k matched tuples. (This conclusion is possible because the hash tables are preferably maintained completely in-memory and the cost for each matched tuple is the same).

Using the definition of selectivity, one evaluation (processing one incoming tuple event) of stream join J requires:

$$C = N^*c \text{(cycles)}$$

Furthermore, when this join is deployed on a single processor machine β with speed $\hat{\beta}$ cycles/(unit time), its service time would be described by:

$$D = \frac{C}{\hat{\beta}} = \frac{N*c}{\hat{\beta}} \quad (1)$$

D is a random variable describing the service time of join J. As expected, it is a function of only the original distribution of values in the joined relations p, the window size z, cost c and processor speed $\hat{\beta}$. Its mean and variance are as follows:

$$E[D] = \frac{c}{\hat{\beta}} E[N] \quad (2)$$

$$\sigma^2[D] = \frac{c^2}{\hat{\beta}^2} \sigma^2[N]$$

Using this terminology, the service rate of join J is then:

$$\mu = \frac{1}{E[D]} \text{ (joins/sec)}$$

Finally, because the join outputs all matched tuples, the output batch size is simply:

$$B = N \text{(tuples/output event)}$$

As noted above, when the pdf's, window sizes or singletuple costs are different for the relations being joined, the calculations above can be carried out separately for each join relation.

By way of example, consider two joins $J_{Zipf}$ and $J_{NYSE}$. The first has its values (of the join predicate columns) distributed with Zipf's probability distribution function, which has been shown to be a useful estimate of the distribution in real-world data sets. The second has an empirical distribution extracted from a full-day trading history of buy and sell bids on the New York Stock Exchange (NYSE).

Figure 7:
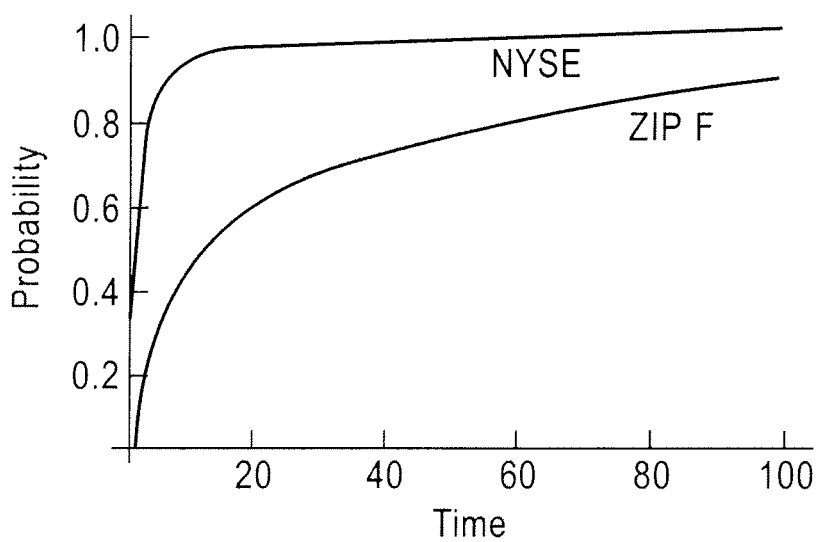
FIG. 7 depicts an exemplary cumulative distribution function (CDF) for the values of a join.

FIG. 7 shows the cumulative distribution functions (CDF) for the values in these joins (there is illustrated the CDF instead of pdf because it is easier to see the difference between the two functions). Let $z_{zipf}=z_{nyse}=1000$, c=100 cycles, and $\hat{\beta}=1000$ cycles/microsecond. Then, $$E[D_{zipf}]=(100/1000)*19.2776=1.92776 \,\mu s$$

$$\sigma^2[D_{zipf}]=(100^2/1000^2)*981.22=9.8122$$

$$E[B_{zipf}]=19.2776$$

$$E[D_{nyse}]=(100/1000)*248589=0.248589 \,\mu s$$

$$\sigma^2[D_{nyse}]=(100^2/1000^2)*39.3072=0.393072$$

$$E[B_{nyse}]=2.48589$$

As expected, the distribution of values in the join relations with respect to the join 'on' predicate has significant effect on the service time, output size and service time variance.

Now that there has been developed above performance models for each of the basic transforms, one can describe the performance of a module containing a subgraph of transforms 401 corresponding to the whole or part of a query execution graph deployed on a broker 403. It will now be shown how these modules can be combined further to characterize the performance of a query in a distributed deployment.

As described earlier, each broker 403 hosts a subgraph of the complete transform graph. The subgraph can consist of a number of logically unrelated segments of various flows. In order to characterize the performance of the broker 403 using a queueing model it is necessary to estimate: 1) the Mean service time ($1/\mu$), 2) Service time Variance ($\sigma_s^2$), and 3) the interarrival and interdeparture time Variances ($\sigma_a^2$, $\sigma_d^2$). There is assumed a measurement of a mean of the arrival rate ($\lambda$).

As described above, each broker 403 contains a queue where all events arrive and are dispatched, preferably in FIFO order, the appropriate flow deployed on that broker. The sequence of transforms 401 in the flow sequentially processes the event and outputs the results to the outgoing channels.

Let F be the set of flows in a broker 403. Let f$\chi$F be a flow that consists of a tree (because the network is feed-forward) of transforms 401 T={$t_1, \ldots t_n$}. The transforms $t_i$ will be executed in some scheduler-dependent order. The scheduling discipline can change from broker 403 to broker 403 or even from event to event, but it is assumed that there will always be a serialization of the transforms 401 on a uniprocessor broker 403.

Now, from above, there is computed the performance parameters for each t$\epsilon$T. The service time of the flow is the sum of the service times of the transforms 401, however, some transforms 401 will need to be executed more than once if their ancestors in the execution sequence produced more than one event (batch size>1) during their invocation. This is referred to as the intra-batching effect which has an important ramification: many events can be leaving a flow in response to a single incoming event and their number and distribution depends on the batch sizes produced within the flow. For this reason the service time of a flow is not the traditional difference between the departure and the arrival times of an event, but instead:

Definition 1. The Service time $D_f$ of a flow f$\chi$F is the total amount of time the server is occupied due to an incoming event arriving at f.

This is a broader definition than is typically utilized and includes computing some of the transforms 401 possibly a number of times to process a batch of events from the upstream transforms 401 within the flow. In the special case, when the output batch sizes of each transform 401 in the flow is exactly 1, the difference in the departure and arrival times for a given event would be the traditional service time for that event.

Formalizing this definition, let $\theta_i$ T be the set of transforms in the path from transform $t_i$ to the root transform $t_1$ (the entry transform for events in this flow), with $\theta_1=\{\ \}$. Then, if $B_j$ is the batch size of messages produced by transform $t_j$, $$D_f = \sum_i D_i \prod_{j|t_j \in \theta_i} B_j \qquad (3)$$

This expression reflects the fact that each transform $D_i$ will be executed once for each event in the output batches of each of the transforms preceding it (information tracked with $\theta_i$). The exact execution order for a flow will depend on the broker implementation, the hardware and operating system scheduler where the flow would be deployed. However, all of these factors will only change the departure process distribution, but not the total number of computing cycles given by $D_f$.

Using equation 3, one can estimate $D_f$ by adding and multiplying the expected values of the individual transforms' service times (according to the flow structure using $\theta_i$). If the service times and batch sizes are independently distributed, the variance can be computed using the formula as follows:

$$\sigma(X*Y)=E(x)^2\sigma(Y)^2\sigma(X)+\sigma(X)\sigma(Y)$$

The $E(D_f)$ and its variance $\sigma(D_f)$ are immediately useful in the M/G/1 and G/G/1 models as will be shown below.

If the information about the transform service time distribution allows it, one can also derive the complete pdf for $D_f$. This is useful when choosing which of the queueing models gives the best approximation.

If the service times of the transforms in the flow can be considered independent, then one can compute $\phi_f(d_f)$, the probability density of flow service time $D_f$, by convolving the summands, using Laplace or Fourier transforms on the pdfs of the summands to convert to the frequency domain and multiplying the resulting functions. If the service times are dependent for some transforms, then the pdf of their sum can be found using the joint pdf of their service times.

For the product terms one can use the relationship that the pdf of V=XY, where X and Y are two random variables, to produce:

$$f_V(v) = \int_{-\infty}^{\infty} f_{X,Y}\left(x, \frac{v}{x}\right)\frac{1}{|x|} dx$$

where $f_{X,Y}$ is the joint pdf. If X and Y are independent, one can use a shortcut of finding the pdfs of ln X and ln Y, and converting the product into a convolvable sum using the following:

$$\prod_{i=1}^{n} x_i = \exp \sum_{i=1}^{n} \ln x_i \qquad (4)$$

where $x_i$ are random variables for $1 \leq i \leq n$, and then performing a transformation of variables to get the resulting pdf of the product.

Figure 5:
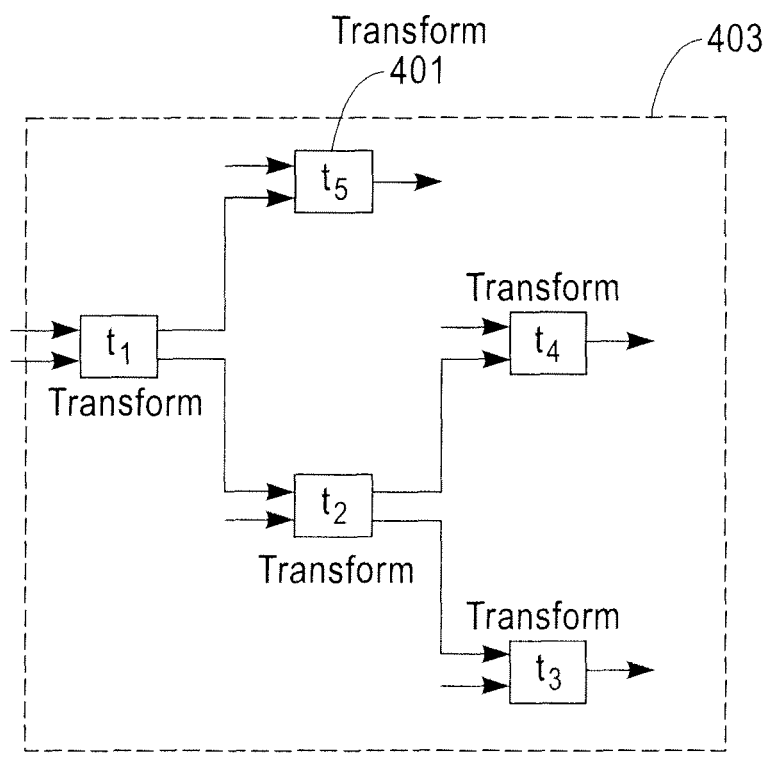
FIG. 5 depicts the flow between transforms in a broker according to an exemplary embodiment of the invention.

With reference to FIG. 5, there is illustrated the flow between transforms 401 in a broker 403. The events enter into transform t1 and exit from transforms $t_3$, $t_4$ and $t_5$. The transforms 401 are numbered in their execution order, which implies that $t_5$ will not process any events until the $t_2$, $t_3$ and $t_4$ has completely finished processing theirs. Using equation 3) one can write service time for the flow for events that enter at $t_1$ and exit at $t_5$ (the longest path with this schedule) as follows:

$$D_f = D_1 + (B_1 \cdot D) + (B_1 \cdot B_2 \cdot D_3) + (B_1 \cdot B_2 \cdot D_4) + (B_1 \cdot D_5)$$

Let $\phi_i$ be the service time probability density for transform $t_i$, $1 \leq i \leq 5$. Consider two cases:

Case 1: First consider the simple case where the output batch sizes are approximated by constants, i.e. let $B_i = 2$ for all i, then let:

$$\phi^*(s) = \int_0^\infty e^{-sx} \phi(x) dx \qquad (5)$$

be the Laplace transform of $\phi$. Then:

$$\phi_f^*(s) = *\phi_1^*(s)\phi_2^*(s)^2 \phi_3^*(s)^4 \phi_4^*(s)^4 \phi_5^*(s)^2$$

Now, applying the inverse Laplace gives the pdf for the service time distribution of the flow:

$$\phi_f(d_f) = ^{-1}(\phi_f^*(s)) \qquad (6)$$

from which one can derive the expected value and the moments in the usual fashion.

Case 2: Let the output batch sizes be random variables, as previously, denoted as $B_i$ for transform $t_1$. Using equation (4) one can evaluate products such as $(B_1 \cdot B_2 \cdot D_3)$ as follows:

$$Z = (B_1 \cdot B_2 \cdot D_3) = \exp(\ln B_1 + \ln B_2 + \ln D_3)$$

and then apply the convolution method above. Namely, if one allows $g_i(\ln B_i) = e^{B_i} \phi_i(e^{B_i})$, then using the notation in equation (5):

$$\phi(z) = \frac{^{-1}[g_1^*(\ln B_1) g_2^*(\ln B_2) g_3^*(\ln D_3)](\ln z)}{z}$$

Applying this method to the rest of the product terms and combining the resulting pdfs with convolution yields $\phi_f(d_f)$ as in equation (6).

Because all the random variables in the system are variables of time, the resulting random variable $D_f$ has units of time and represents the complete service time of the flow.

In the distributed setting, where a flow can be strung across several brokers 403, a correct characterization of the departure distributions for each broker 403 plays a critical role in its performance analysis.

In typical queueing systems one often assumes that for each event entering a server one event eventually leaves the server. In a stream processing system with transforms such as joins and selects, this is not true. As is illustrated above, a sequence of transforms can produce multiple events due to the intra-batching effects, including batches of size 0, as is the case for threshold selects (e.g. producing no output events until the total volume sold>100,000).

However, one does not need a very accurate interdeparture distribution because of the network factor discussed below. Namely, because all broker to broker communications go through a non-zero delay 'server' that represents a network channel, one needs only to estimate the departure rate correctly.

Once one obtains the pdf of the service time distribution of a flow as derived above, one can construct a corresponding density function for the departure process. Let $a_f(t)$ be the pdf of inter-arrival times $T_a$ for some flow f in broker $T_a$. Let $S_f(t)$ be the cdf of the service time of the flow. The cdf $CT_f(t)$ of the inter-departure time random variable $T_f$ can be estimated [11] as:

$$CT_f(t) = \rho S_f(t) + (1-\rho) \int_0^t S_f(t-u) a(u) du$$

where $$\rho = \sum_f \left( \frac{\lambda_f}{\mu_f} \right),$$

the broker utilization due to all flows. For each transform $t_i$ whose outputs leave the broker, that transform will emit a batch of events of size $X_i$, each time an event arrives at the root of its flow, where:

$$X(i) = \prod_{j | t_k \in \theta_i} B_j \qquad (7)$$

Therefore, the outgoing event rate $N_i$ (in events per unit time) at transform $t_i$ is:

$$N_i = \frac{X_i}{T_f}$$

whose distribution $\phi_N$ we can be readily computed using the same log expansion approach as in equation (4).

If one does not have either the interarrival or the service time distributions, one can approximate the departures using:

$$c_d^2 = 1 + (1-\rho^2)((c_a^2 - 1) + \rho^2(\max(c_s^2, 0.2) - 1)$$

where $c_d^2$ is the coefficient of variance for the departure distribution, while the departure rate is the arrival rate $\lambda * X_i$. However, one should note that the approximation for $c_d^2$ is likely to be sensitive to the transform evaluation schedule on the broker.

To model the complete broker with multiple incoming streams and multiple flows, it is proposed herein to use an aggregation/disaggregation approach. The basic idea of the approach is to first aggregate the input streams into a single stream and pretend that all the transform flows behave as one server. Then, compute the marginal metrics for the individual flows from the combined result. The formula for aggregation applicable in this case is:

$$\hat{\mu} = \frac{\hat{\lambda}}{\sum_f \lambda_f/\mu_f}; \hat{c}_s^2 = \frac{\hat{\mu}^2}{\hat{\lambda}}\left(\sum_f \frac{\lambda_f}{\mu_f^2}(c_{sf}^2+1)\right) - 1 \quad (8)$$

where $\mu_f = 1/D_f$, the service rate for flow f and $\lambda_f$ is its input rate. $c_{sf}^2 = \rho(D_f)/E[D_f]^2$ is the squared coefficient of variance for flow service time.

If the combined input stream distribution is known to be Poisson, then one can directly use the Pollaczek-Khintchine (PK) formula for M/G/1 using the service time and variance derived above. In which case, the aggregate $\hat{\lambda}$ is simply the sum of the expected values of the individual flow input rates.

For other cases, one assumes a general distribution for arrivals, for which we use the following formula:

$$\hat{c}_a^2 = (1-w) + w\left(\sum_f c_{af}^2 \frac{\lambda_f}{\hat{\lambda}}\right) \quad (9)$$

$$w = [1 + 4(1-\rho)^2(v-1)]^{-1} \quad (10)$$

$$v = \left[\sum_f \left(\frac{\lambda_f}{\hat{\lambda}}\right)^2\right]^{-1} \quad (11)$$

where $c_{a_f}^2$ is the coefficient of variance for the arrival stream for flow f and $\rho = \hat{\lambda}/\hat{\mu}$.

One can now use these to compute the expected queue wait via a G/G/1 approximation:

$$W_q = \left(\frac{\rho}{1-\rho}\right)\left(\frac{\hat{c}_a^2 + \hat{c}_s^2}{2}\right)\left(\frac{1}{\hat{\mu}}\right) \quad (12)$$

Which can be used to compute the expected latency $W_f$ of each flow f through a broker by simply adding the expected service time of the flow to the queueing delay:

$$W_f = W_q + 1/\mu_f \quad (13)$$

In summary, if the service time for each flow is predicted correctly, one can use existing machinery for estimating system performance.

The bulk of network communications today are over packet switching networks. Performance analysis of networks using queueing techniques is widespread. On shared networks (with traffic exogenous to stream processing) there is recent evidence that the most appropriate model is heavy-tailed. For example, there has been developed closed form models for M/Pareto/1 to represent the network in a queueing system.

One important network factor to be considered for modeling a distributed system of transform flows is what effect the network links between brokers would have on the distribution of arrivals. While there is not herein an attempt to predict the interdeparture process of a channel one can observe that when brokers produce batched departures (e.g. with joins), the batches will be dissipated by the channels and therefore brokers do not need to be modeled for batch arrivals. Informally, this can be shown by observing that even if a channel receives a batch of events, the events leaving the channel to enter another broker would be spaced out by the service time of the channel, which cannot be zero.

The key output of the model described above, wherein queuing theory is applied to ascertain the efficiency of the distribution of transforms 401 amongst a multitude of brokers 403, is the service time estimate $W_q$ for each of the deployed transforms 401. These can then be summed up (together with the network transmissions costs) to compute the total end-to-end time, or flow service time $W_f$, it takes for an event to percolate from a publisher to a subscriber via a transform graph as detailed in Equations (12) and (13) to compute this time per flow.

After applying the method for flow service time computation described above to obtain $W_q$ and $W_f$, one can proceed to find an optimal assignment of tasks, or transforms, specifically, one that globally minimizes the average flow service time over all publisher-subscriber pairs. Typically, such an optimization would involve the application of a localized iterative search. However, exemplary embodiments of the invention utilize a broker bottleneck elimination strategy detailed below to optimize the performance of the system.

Figure 6:
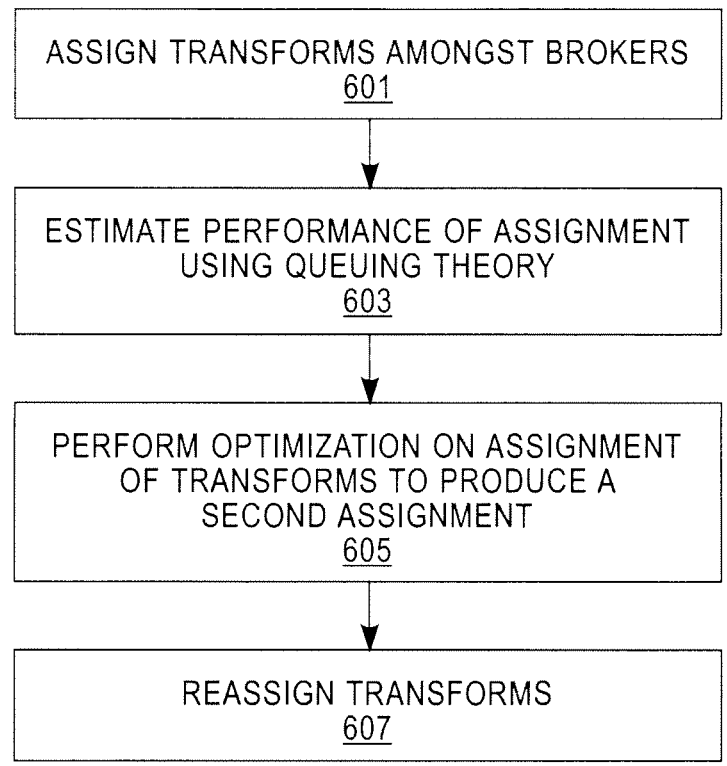
FIG. 6 depicts an exemplary embodiment of the method of the invention.

With reference to FIG. 6, there is illustrated an exemplary embodiment of the methodology of the invention. At block 601 an initial distribution of transforms to a multitude of brokers is performed. At block 603, the performance of the system is computed by computing the flow service time $W_f$ for each flow and the accompanying utilization of each broker. At block 605, an optimization of the assignment of transforms is performed via the application of a bottleneck elimination strategy. Lastly, at block 607, the transforms are reassigned in accord with the optimized assignment.

This process is described more fully with reference to Exhibit 1.
Exhibit 1:

---

Process: New Placement
Inputs:   Task Graph -- TG,
           Topology Graph - TP,
           Runtime Metrics - RM,
           Number of solution starting points - N
           Neighborhood size - K
           Subscription Weights -- A
Result: Assignment - PI, Solution Value -- VAL
Begin
   Let BestSolution = MAX_INT; // a large number
   Let BestAssignment = null;
   FOR Iteration = 0 to N
     1.  Generate a Random Assignment - PI
     2.  Compute the ingredients for the value of the current solution:
          a.  Flow Service Time ($W_f$) for each flow using equation 13
          b.  Utilization for each Broker (rho) and each Link due to
              the assignment (part of computation of equation 13)

-continued

```
   3. Compute CurrentSolution = a₁*W_f₁ + a₂*W_f₂ + ... + aₙ*W_fₙ where
      W_fᵢ represents the service time of flow i and aᵢ represents the importance
      of that flow with respect to the others.
   4. Attempt to improve the solution via "Broker Bottleneck Elimination"
      WHILE cannot improve CurrentSolution any further:
         a.  Let MostLoaded = broker with highest utilization computed in step 2b.
         b.  Let Neighbors = brokers 1...K-distance away from MostLoaded
         c.  FOR each broker B which is 1...K-distance away from MostLoaded:
               c1.  For each task T on MostLoaded try to move it to B by
                    recomputing the solution quality as in steps 2, 3
               c2.  Pick the task that produces the largest improvement compared to
                    CurrentSolution and consider the move permanent.
         end WHILE
   5. Compare CurrentSolution to BestSolution.
      If CurrentSolution < BestSolution Then {
            BestSolution = CurrentSolution;
            BestAssignment = PI;
      }
   end FOR
end
```

Inputs to the process illustrated in Exhibit 1 include a Task Graph TG, a Topology Graph TP, Runtime Metrics RM, a Number of solution starting points N, a neighborhood size K and Subscription Weights A. Descriptions of these inputs are as follows.

The Task (Transform) Graph (TG) is a set of Tasks connected by Links. It is a directed graph that specifies the direction of event (message) flow.

The Topology Graph (TP) is a set of Brokers connected by Channels. It is an 'undirected' graph because information can go in either direction. The TP can be supplied by a person or an automated service that 'discovers' brokers in a distributed system. Since the context of the invention is a distributed stream processing system, the TP is likely to be provided by a service that continuously monitors what brokers are available and how they are connected. To those knowledgeable in the state of the art it is known that the technology for discovering brokers and their connections is well understood and a number of techniques and tools directed to such services are available. Likewise, the computations described herein relating to performance measurement and optimization of the system may take place upon an execution engine 413 coupled to a broker 403 or upon an external processor coupled to the processing system 411.

Specific parameters important for computation of the method described herein include:

1. Channel speed (in bytes/sec) is needed to compute the 'service rate of a channel' for a given size message. The equation for this is speed/EventSize. For example a channel with speed 100,000 bytes/sec can process 1000 byte messages at the rate of 100/sec; and
2. Physical Latency—the mean transmission delay Runtime Metrics (RM) consist of data for Tasks (Transforms) and Links that should be collected in the course of system operation. RM's purpose is to provide accurate measurement values of system status for the model. Here are its components:

For Each Task:
1. taskId—a unique task id in the task graph
2. meanServiceTime—represented by \mu
3. varServiceTime—service time variance
4. meanBatchSizeProduced—average number of messages produced (batch size) by a given task after it processes one incoming event
5. varBatchSize—variance of batch size For Each Link:
1. t0 and t1 represent the taskId's that this link connects
2. lambda—the mean rate (in messages/sec) of events that go from t0 to t1
3. sq-coeff-of-variance (a.k.a SEV) is a variance statistic for lambda
4. meanBatchSize—same as meanBatchSizeProduced of t0
5. varBatchSize—same as varBatchSize of t0
6. eventSize—mean size (in bytes) of the events leaving t0

The Number of Solution starting points (N) refers to how many times the search algorithm is going to generate a new starting point. Because it is an iterative method that explores neighborhoods around each point via gradient descent, the more points explored the higher the likelihood of finding a better solution. The number should be chosen depending on how much time the algorithm can run and remain practical. Typical values of N>=10,000 result in algorithm runtimes for typical systems of approximately several seconds in duration.

The Neighborhood size (K) is a configuration parameter that tells the search how many 'neighboring' brokers to consider when attempting to offload a task. Given a broker B that one desires to move a task from, for K=1 only the brokers with a direct channels to B would be considered. For K=2, brokers 2 channels away would be considered, etc. in practice, values of K equal to two or three produces favorable results.

Subscription weights (A) is a configuration parameter that allows the system designer or users to set the optimization priorities for the search. These 'weights' specify which tasks are more important than others.

Turning to the placement algorithm of FIG. 6, there is now described, in general, its operation. At step 1, an initial assignment of transforms to brokers is realized. While illustrated with reference to a random allocation of transform, the invention is drawn broadly to include any and all methods for allocating transforms amongst brokers.

Next, at step 2, the flow service time $W_f$ for each flow is computed as described above with reference to equation (13). In addition, the utilization of each broker and each link due to the assignment is computed.

At step 3, a CurrentSolution variable is computed to reflect the efficiency of the assignment. CurrentSolution is computed by summing the products of individual flow service times and their corresponding importance as defined by a subscription weight.

At step 4, there is applied the broker bottleneck elimination algorithm noted above. The broker bottleneck elimination algorithm seeks to more nearly optimize the distribution of transforms amongst the brokers. At a high level, the broker bottleneck elimination algorithm aims to intelligently move transforms from highly utilized brokers to less utilized brokers in an iterative fashion while continually checking to see if the move results in a better assignment than that which is presently implemented. First, the broker with the highest utilization computed in step 2 is identified. Then, a set of neighboring brokers within a specified distance of the identified broker is formed. For each of the brokers in the set of neighbors, tasks, or transforms, are moved from the highly utilized broker to the neighboring broker and the CurrentSolution is again computed as described above. The transform whose movement results in the largest change in the CurrentSolution is moved and its new location made permanent. The process is repeated until a point is reached at which further transform relocations does not result in an improvement of the computed Current Solution.

The final computed CurrentSolution is compared to a BestSolution variable initialized to be equal to a maximum integer. Therefore, the first iteration is likely to produce a CurrentSolution value less than the initial BestSolution value. In all cases, if the CurrentSolution value is less than the BestSolution value, the BestSolution value is set equal to CurrentSolutionValue and the existing assignment is made the BestAssignment. Subsequent iterations of the broker bottleneck elimination algorithm do not involve a re-initialization of the BestSolution to equal a maximum integer and thus BestSolution reflects the best solution arrived at any point in the placement process. The placement process is preferably run repeatedly at intervals chosen to update the allocation or assignment of transforms as required by the system.

The above placement algorithm applies, at step 4, the broker bottleneck elimination algorithm to more optimally arrange transforms on a multitude of brokers. With reference to the following Exhibit 2, there is described in detail the implementation of an alternative embodiment of the placement algorithm described above wherein step 4 is directed to reassigning the logical links between brokers to relieve channel congestion.

---

4. Attempt to improve the solution via "Channel Bottleneck Elimination"
    WHILE cannot improve CurrentSolution any further:
        a.    Let MostLoadedChannel = channel with highest utilization computed in step 2b.
        b.    Let AlternateRoutes_L = set of possible alternative routes for link L
        c.    FOR each link L deployed on MostLoadedChannel:
            c1.    For each route R in AlternateRoutes of L

---

Exhibit 2.

While there has been illustrated and described what is at present considered to be preferred embodiments of the invention, it will be appreciated that numerous changes and modifications are likely to occur to those skilled in the art. It is intended in the appended claims to cover all those changes and modifications that fall within the spirit and scope of the claimed invention.

What is claimed is:

1. A method comprising:
   estimating a performance of a processing system using queueing theory, wherein said processing system comprises a network that receives at least one input message stream, transforms said at least one input message stream into at least one output message stream utilizing a plurality of transforms distributed in a first assignment among a plurality of brokers, and outputs said at least one output message stream, where a movement of one of said input message streams to one of said output message streams comprises a data flow passing through at least one of said plurality of brokers, where in the first assignment each transform is assigned to a broker, and where the network comprises both links providing logical connections for data flows between entities in the network and channels providing physical media over which the data flows corresponding to the logical connections travel, the channels physically connecting the brokers, where one or more links are assigned to each channel in the first assignment;
   performing optimization upon said first assignment of said plurality of transforms using said estimated performance to produce a second assignment, wherein performing optimization further comprises:
   re-estimating the performance of said system based at least on computation of a flow service time Wf for each of said plurality of data flows and computation of a utilization for each of said plurality of brokers, each of said plurality of links, and each of said pluralities of channels;
   identifying a most loaded channel having a highest one of said utilizations of said plurality of channels;
   reassigning at least one transform from a highest utilized broker to brokers within a predetermined number of channels away from the highest utilized broker;
   performing re-estimating and reassigning at least one transform for each of the brokers within the predetermined number of channels away from the highest utilized broker;
   selecting a best reassignment from the reassigning at least one transform and as judged by the re-estimating as the second assignment; and
   reassigning said plurality of transforms in accordance with said second assignment; and where the reassigning said plurality of transforms results in at least one transform being reassigned from an initial broker to a different broker.

2. The method of claim 1 wherein said network receives said at least one input message stream from at least one publishing client.

3. The method of claim 1 wherein said network outputs said at least one output message stream to at least one subscribing client.

4. The method of claim 1, wherein said estimating and re-estimating comprises:
   computing the flow service time $W_f$ for each of said plurality of data flows, wherein computing a service flow service time $W_f$ further comprises determining a queueing delay and an expected service time for each broker in each data flow and summing the queueing delay and the expected service time for each of the brokers in the data flow to determine the flow service time $W_f$ for a corresponding flow; and computing a current solution value comprising a sum of a plurality of products of each of said plurality of flow service times and a corresponding weight.

5. The method of claim 4 wherein a weight is indicative of an importance of a single one of said plurality of flow service times with respect to other ones of said plurality of flow service times.

6. The method of claim 1, wherein performing re-estimating and reassigning is repeated at least approximately 5,000 times.

7. The method of claim 6 wherein said performing re-estimating and reassigning is repeated at least approximately 10,000 times.

8. The method of claim 1, wherein performing optimization comprises changing at least one link between at least two of said plurality of brokers.

9. A memory tangibly embodying a program of machine-readable instructions executable by a digital processing apparatus to perform operations to optimize an assignment of transforms, the operations comprising: estimating a performance of a processing system using queueing theory, said processing system comprising:
a network comprising a plurality of brokers that receives at least one input message stream, transforms said at least one input message stream into at least one output message stream utilizing a plurality of transforms distributed in a first assignment among said plurality of brokers, and outputs said at least one output message stream, where a movement of one of said input message streams to one of said output message streams comprises a data flow passing through at least one of said plurality of brokers, where in the first assignment each transform is assigned to a broker, and where the network comprises both links providing logical connections for data flows between entities in the network and channels providing physical media over which the data flows corresponding to the logical connections travel, the channels physically connecting the brokers, where one or more links are assigned to each channel in the first assignment;
performing optimization upon said assignment of said plurality of transforms using said estimated performance to produce a second assignment, wherein performing optimization further comprises:
re-estimating the performance of said system based at least on computation of a flow service time Wf for each of said plurality of data flows and computation of a utilization for each of said plurality of brokers, each of said plurality of links, and each of said pluralities of channels;
identifying a most loaded channel having a highest one of said utilizations of said plurality of channels;
reassigning at least one transform from a highest utilized broker to brokers within a predetermined number of channels away from the highest utilized broker;
performing re-estimating and reassigning at least one transform for each of the brokers within the predetermined number of channels away from the highest utilized broker;
selecting a best reassignment from the reassigning at least one transform and as judged by the re-estimating as the second assignment; and
reassigning said plurality of transforms in accordance with said second assignment, and where the reassigning said plurality of transforms results in at least one transform being reassigned from an initial broker to a different broker.

10. The memory of claim 9, wherein said estimating and re-estimating comprises:
computing a flow service time $W_f$ for each of said plurality of data flows, wherein computing a service flow service time $W_f$ further comprises determining a queueing delay and an expected service time for each broker in each data flow and summing the queueing delay and the expected service time for each of the brokers in the data flow to determine the flow service time $W_f$ for a corresponding flow;
computing a current solution value comprising a sum of a plurality of products of each of said plurality of flow service times and a corresponding weight.

11. The memory of claim 10 wherein a weight is indicative of an importance of a single one of said plurality of flow service times with respect to other ones of said plurality of flow service times.

12. The memory of claim 9 wherein said performing optimization comprises changing at least one link between at least two of said plurality of brokers.

13. The memory of claim 9, wherein said performing re-estimating and reassigning is repeated at least approximately 5,000 times.

14. The memory of claim 13 wherein said performing re-estimating and reassigning is repeated at least approximately 10,000 times.

15. An apparatus comprising:
at least one memory comprising computer-readable code;
at least one processor configured, in response to executing the computer-readable code, to cause the apparatus to perform the following:
estimating a performance of a processing system using queueing theory, where a movement of one of said input message streams to one of said output message streams comprises a data flow passing through at least one of said plurality of brokers, where in the first assignment each transform is assigned to a broker, and where the network comprises both links providing logical connections for data flows between entities in the network and channels providing physical media over which the data flows corresponding to the logical connections travel, the channels physically connecting the brokers, where one or more links are assigned to each channel in the first assignment; and
performing optimization upon said first assignment of said plurality of transforms using said estimated performance to produce a second assignment, wherein performing optimization further comprises:
re-estimating the performance of said system based at least on computation of a flow service time Wf for each of said plurality of data flows and computation of a utilization for each of said plurality of brokers, each of said plurality of links, and each of said pluralities of channels;
identifying a most loaded channel having a highest one of said utilizations of said plurality of channels;
reassigning at least one transform from a highest utilized broker to brokers within a predetermined number of channels away from the highest utilized broker;
performing re-estimating and reassigning at least one transform for each of the brokers within the predetermined number of channels away from the highest utilized broker;
selecting a best reassignment from the reassigning at least one transform and as judged by the re-estimating as the second assignment; and reassigning said plurality of transforms in accordance with said second assignment, and where the reassigning said plurality of transforms results in at least one transform being reassigned from an initial broker to a different broker.

16. The apparatus of claim 15 wherein a movement of one of said input message streams to one of said output message streams comprises a data flow passing through at least one of said plurality of brokers.

17. The apparatus of claim 16 wherein said estimating and re-estimating comprises:
computing a flow service time $W_f$ for each of said plurality of data flows, wherein computing a service flow service time $W_f$ further comprises determining a queueing delay and an expected service time for each broker in each data flow and summing the queueing delay and the expected service time for each of the brokers in the data flow to determine the flow service time $W_f$ for a corresponding flow; and
computing a current solution value comprising a sum of a plurality of products of each of said plurality of flow service times and a corresponding weight.

18. The apparatus of claim 17 wherein each of said plurality of weights is indicative of an importance of a single one of said plurality of flow service times with respect to other ones of said plurality of flow service times.

19. The apparatus of claim 15 wherein said performing optimization comprises performing broker bottleneck elimination.

20. A computer program product comprising a memory having computer usable program code for optimizing an assignment of a plurality of transforms amongst a plurality of brokers, said computer program product including:
computer usable program code for estimating a performance of a processing system using queueing theory wherein said processing system comprises a network that receives at least one input message stream, transforms said at least one input message stream into at least one output message stream utilizing a plurality of transforms distributed in a first assignment among a plurality of brokers, and outputs said at least one output message stream, where a movement of one of said input message streams to one of said output message streams comprises a data flow passing through at least one of said plurality of brokers, where in the first assignment each transform is assigned to a broker, and where the network comprises both links providing logical connections for data flows between entities in the network and channels providing physical media over which the data flows corresponding to the logical connections travel, the channels physically connecting the brokers, where one or more links are assigned to each channel in the first assignment;
computer usable program code for performing optimization upon said first assignment of said plurality of transforms using said estimated performance to produce a second assignment, wherein the computer usable program code for performing optimization further comprises:
computer usable program code for re-estimating the performance of said system based at least on computation of a flow service time Wf for each of said plurality of data flows and computation of a utilization for each of said plurality of brokers, each of said plurality of links, and each of said pluralities of channels;
computer usable program code for identifying a most loaded channel having a highest one of said utilizations of said plurality of channels;
computer usable program code for reassigning at least one transform from a highest utilized broker to brokers within a predetermined number of channels away from the highest utilized broker;
computer usable program code for performing re-estimating and reassigning at least one transform for each of the brokers within the predetermined number of channels away from the highest utilized broker;
computer usable program code for selecting a best reassignment from the reassigning at least one transform and as judged by the re-estimating as the second assignment; and
computer usable program code for reassigning said plurality of transforms in accordance with said second assignment, and where the reassigning said plurality of transforms results in at least one transform being reassigned from an initial broker to a different broker.

21. The computer program product of claim 20 wherein said computer usable program code for estimating and for re-estimating comprises:
computer code for computing a flow service time $W_f$ for each of at least one data flow, wherein computing a service flow service time $W_f$ further comprises determining a queueing delay and an expected service time for each broker in each data flow and summing the queueing delay and the expected service time for each of the brokers in the data flow to determine the flow service time $W_f$ for a corresponding flow; and
computer code for computing a current solution value comprising a sum of a plurality of products of each of said at least one flow service times and a corresponding weight.

22. The computer program product of claim 20 wherein said computer code for performing said optimization comprises changing a link between at least two of said plurality of brokers.

* * * * *